United States Patent [19]
Houston

[11] Patent Number: 5,217,041
[45] Date of Patent: Jun. 8, 1993

[54] DUAL DISK INCINERATOR VALVE

[76] Inventor: Reagan Houston, 252 Foxhunt La., Hendersonville, N.C. 28739

[21] Appl. No.: 904,134

[22] Filed: Jun. 25, 1992

[51] Int. Cl.⁵ .............................................. F16K 1/00
[52] U.S. Cl. ................................ 137/240; 137/614.11
[58] Field of Search ........................... 137/614.11, 240; 251/367

[56] References Cited

U.S. PATENT DOCUMENTS

| | | | |
|---|---|---|---|
| 3,870,474 | 3/1975 | Houston | 23/2776 |
| 4,103,708 | 8/1978 | Huntington | 137/614.11 |
| 4,239,061 | 12/1980 | Peterson | 137/614.11 |
| 4,372,338 | 2/1983 | Efferson | 137/240 |
| 4,583,568 | 4/1986 | Yumckawa et al. | 137/240 |
| 5,000,422 | 3/1991 | Houston | 251/306 |

Primary Examiner—A. Michael Chambers
Attorney, Agent, or Firm—Lyon & Delevie

[57] ABSTRACT

A flow control valve comprising a pair of parallel, circular butterfly disks that are connected to a shaft for rotation about an axis extending diametrically of a cylindrical valve housing. The parallel disks form a valve plenum within the housing when the valve is in a closed position. A pair of annular flanges on the inner periphery of the valve housing each align radially with a respective one of the butterfly disks when the valve is in the closed position. A small gap is provided between each flange and corresponding disk to facilitate thermal expansion of the valve components. At least a portion of the shaft is hollow and extends externally through the housing. The hollow portion of the shaft is provided with a first aperture located within the valve plenum and a second aperture located external to the valve housing. An external pressure source connects to the second aperture to pressurize or vent the valve plenum to prevent any fluid leakage through the valve.

4 Claims, 2 Drawing Sheets

DUAL DISK INCINERATOR VALVE

BACKGROUND OF THE INVENTION

This invention relates generally to incinerator systems for the abatement of process emissions and more specifically to a novel valve for the control of fluid flow to and from a regenerative incinerator.

Process emissions often contain combustible contaminants that, if released to atmosphere, have the potential of polluting the environment. Incinerators increase the temperature of such process emissions to a temperature above the ignition temperature of the contaminants therein so as to oxidize the contaminants.

One problem that materially effects the efficiency of such incinerators is leakage of contaminated emissions past the relatively large flow control valves required for control of fluid flow to and from the incinerators. The flow control valves in the open mode of operation direct the emissions into one or more regenerators thence to high temperature combustion chambers. Concomitantly, other flow control valves in the closed mode of operation block the flow of contaminated emissions to regenerators that are vented to atmosphere or are being purged of contaminants. Leakage past the flow control valves operating in the latter mode seriously compromises incinerator system efficiency, and creates potential purity problems with the incinerator exhaust emission.

Typical backflow preventers have been used in the past for pressurized environments such as heating systems and water supply systems to prevent the backflow (i.e., reversal of normal flow) of possible contaminants into uncontaminated flow lines. However, backflow preventers are constructed in complex, multiple valve stages. Thus, backflow preventers add excessive hardware to the system at an attendant high cost. Simpler known valve arrangements, such as a ball valve with associated venting, are not large enough to adequately function as incinerator flow control valves and/or cannot be feasibly constructed of materials able to operate over typical incinerator temperature ranges of 50° F. to 1000° F. (~18° C. to 540° C).

SUMMARY OF THE INVENTION

It is therefore an object of the present invention to provide a flow control valve which incorporates a leakage control system to preclude leakage of emissions past the valve.

It is also an object of the present invention to provide a flow control valve which provides a pressure differential within the valve to preclude the leakage of emissions through the valve.

It is further an object of the present invention to provide a flow control valve which is pressurized or vented to preclude any fluid leakage through the valve.

In accordance with the present invention, a flow control valve comprises a cylindrical valve housing, a pair of parallel circular valve disks, and a shaft extending diametrically through the valve housing. At least a portion of the shaft is hollow and extends external to the housing. A mounting means is provided for mounting the pair of circular valve disks to the shaft in parallel relation to each other to form a valve plenum between the pair of disks. The shaft causes the pair of disks to rotate between a valve open position and a valve closed position. A pair of annular housing flanges are located on the inner periphery of the valve housing. Each flange radially aligns with a respective one of the pair of circular valve disks when the valve is in the closed position. Each of the pair of flanges extends radially to an inside diameter greater than the outside diameter of the respective one of the pair of valve disks so as to provide a clearance therebetween. A first aperture is located in the hollow portion of the shaft extending internally of the housing, and a second aperture is located in the hollow portion of the shaft extending externally of the housing. A conduit means is connected to the hollow portion of the shaft extending externally of the housing, and to an external pressure source. The conduit means provides a fluid flow path between the valve plenum and the external pressure source when the valve is in the closed position.

In further accordance with the present invention, the external pressure source is at a higher (or lower) pressure than the pressure either upstream or downstream of the valve. The conduit means further comprises a sleeve attached externally to the valve housing and encompassing the hollow portion of the shaft extending externally of the valve housing. An inlet in the sleeve provides for connection to the external pressure source. The second aperture aligns with the inlet when the valve is in the closed position.

The present invention will be more fully understood upon reading the following detailed description of the preferred embodiment in conjunction with the accompanying drawings.

DETAILED DESCRIPTION OF THE PREFERRED EMBODIMENT OF THE INVENTION

Figure 1:
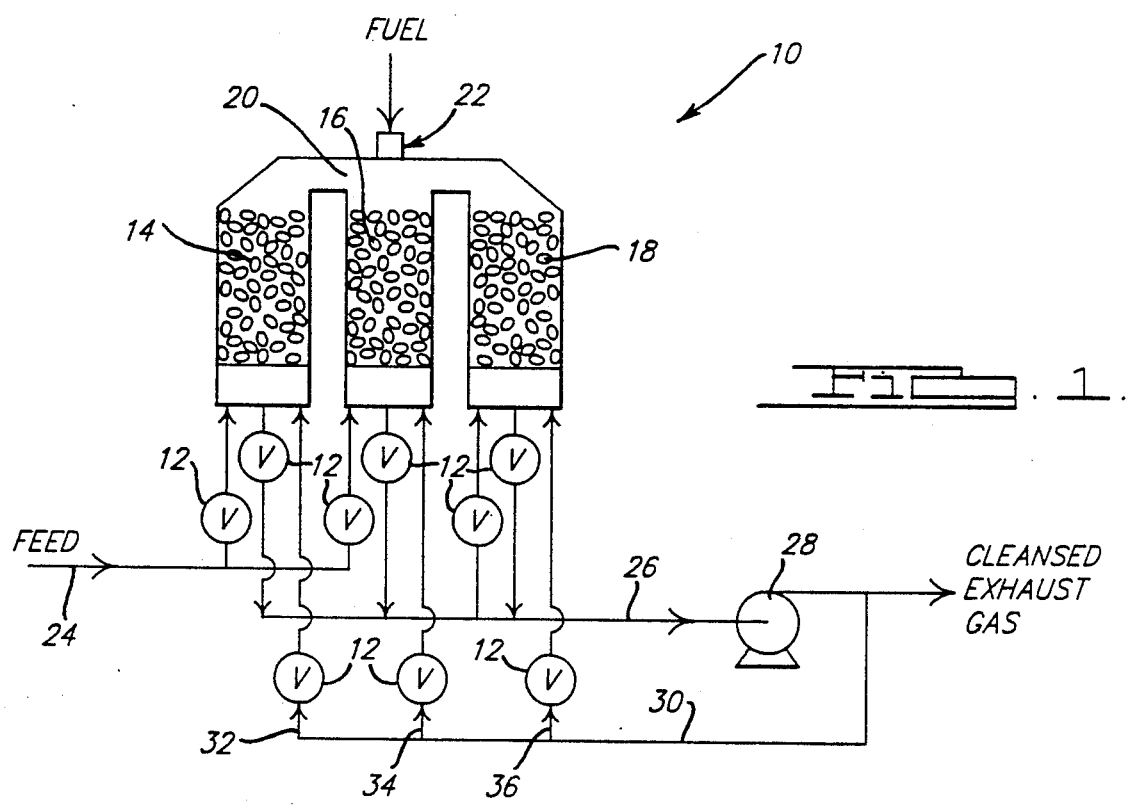
FIG. 1 is a schematic representation of a regenerative incinerator system for which the improved flow control valve of the present invention is utilized.

Referring to FIG. 1, a regenerative incinerator 10 illustrates an environment wherein the present invention has particular utility. The incinerator 10 utilizes a plurality of valves 12 to control the flow of contaminated emissions and cleansed air to and from the incinerator 10, respectively.

The incinerator 10 comprises a plurality of conventional regenerator beds 14, 16 and 18 that communicate with a combustion chamber 20. Fuel, such as natural gas, is supplied to a burner 22 for heating combustion chamber 20 to a desired combustion temperature. Process emissions containing volatile organic combustibles (VOC) are fed at a pressure below atmosphere to incinerator 10 by a duct 24. Cleansed air is conducted away from the incinerator 10 by a duct 26 that is in fluid communication with an exhaust blower 28. Exhaust air is vented to atmosphere or conducted through a conduit 30 to ducts 32, 34 and 36 to purge the regenerator beds 14, 16 or 18, selectively, or to pressurize the valves 12, as will be described.

Valves 12 are selectively opened or closed to form an abatement cycle where one of the regenerative beds functions as a feed bed, another regenerative bed functions as an exhaust bed, and the idle regenerative bed is purged. This type of abatement process is described in commonly-owned U.S. Pat. No. 3,870,474, and incorporated by reference herein.

Figure 2:
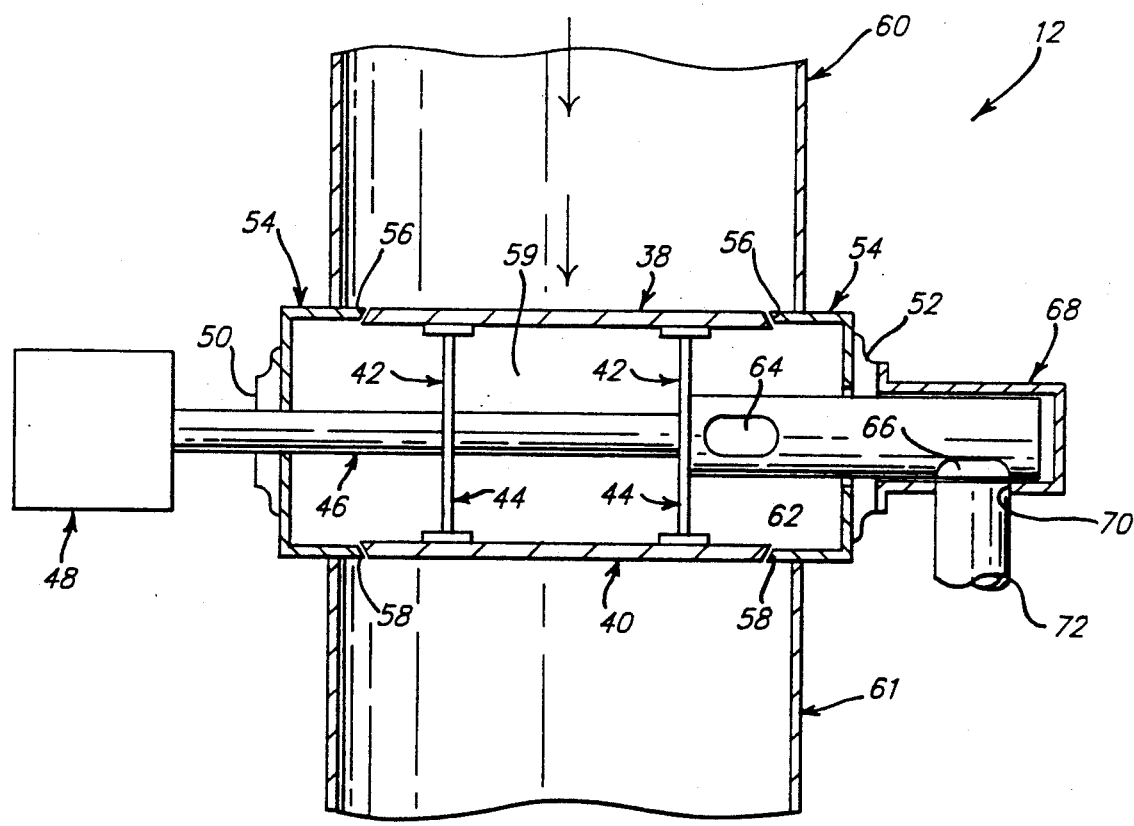
FIG. 2 is a cross-sectional view of a flow control valve in accordance with the present invention shown in a closed position.
Figure 3:
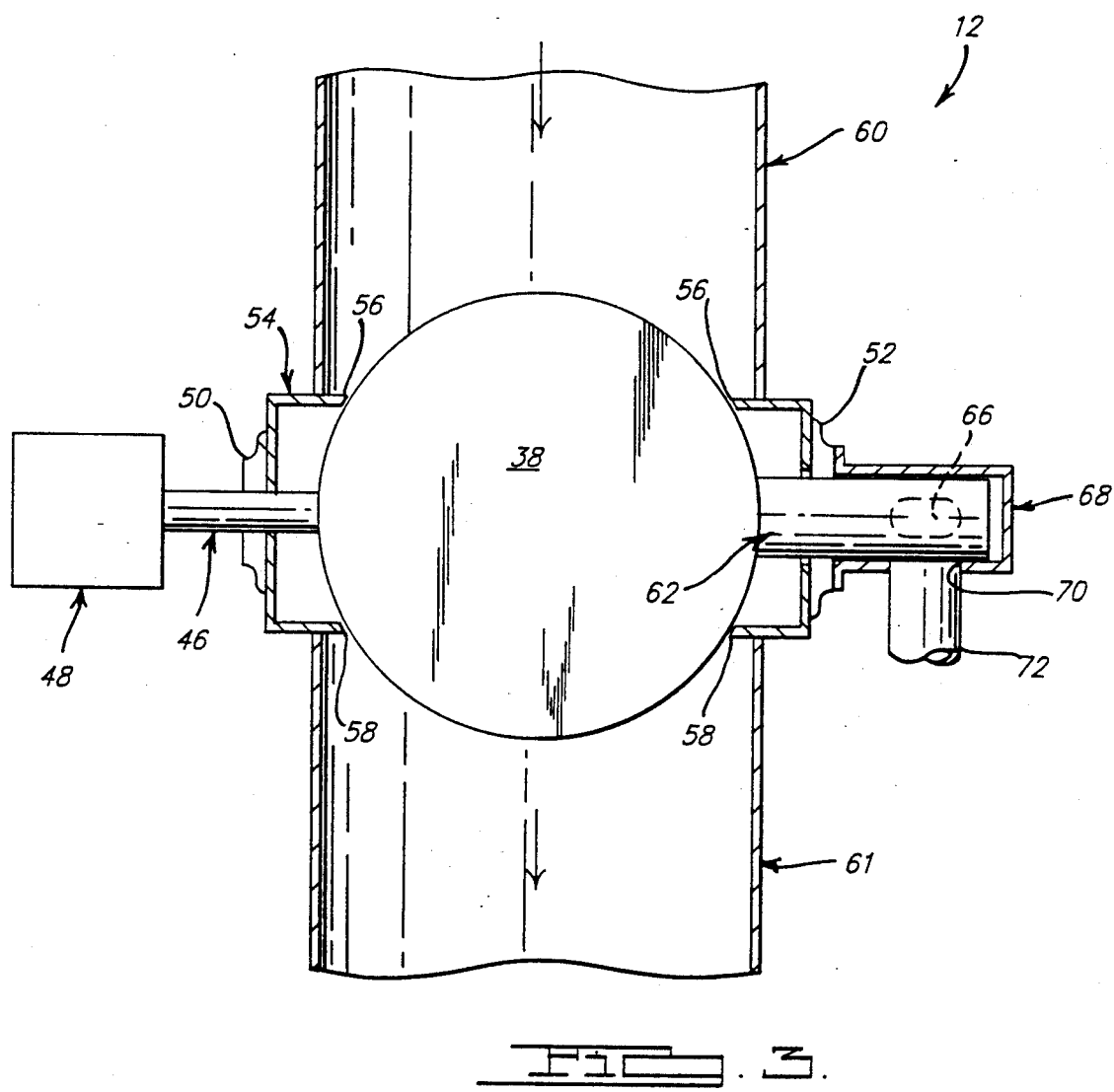
FIG. 3 is a cross-sectional view of the flow control valve of FIG. 2 shown in an open position.

Referring to FIG. 2, in accordance with the present invention, each flow control valve 12 comprises a pair of parallel disks or butterflies 38 and 40 which are mounted by a respective set of plates 42 and 44 to a shaft 46. An actuator 48 controls rotation of shaft 42 relative to a pair of bearings 50 and 52 respectively mounted to opposite exterior surfaces of a valve housing 54. A set of flanges on housing 54 provide a first annular lip or edge surface 56 surrounding the entire periphery of disk 38 (when in the closed position), and a second annular lip or edge surface 58 surrounding the entire periphery of disk 40. Annular lips 56 and 5 function to form a seal around disks 38 and 40 when the valve 12 is closed. However, a small clearance or gap between lips 56 and 58 and the corresponding disk is required to facilitate thermal expansion of the various valve components. A gap of 0.020 inches (~0.05 cm) provides a sufficient clearance over the entire operating temperature range of the incinerator 10 for valves up to 18" diameter.

In further accordance with the present invention, the space or plenum 59 between valve disks 38 and 40 is vented to prevent any flow leakage from the upstream duct section 60 to the downstream duct section 61 when valve 12 is closed, such as results from the required clearances of the lip seals. Particularly, a hollow shaft 62 is fastened such as by welding to shaft 46. Shaft 62 preferably has a larger diameter than shaft 46. A first aperture 64 is located in a portion of shaft 62 internal to plenum 59. A second aperture 66 is located in shaft 62 external the valve housing 54. Apertures 64 and 66 cooperate with an external pressure source to provide a vent for plenum 59, as will be described hereinbelow.

An external vent sleeve 68 is mounted to bearing 52 so as to incase the portion of hollow shaft 62 external the valve housing 54. An aperture 70 in vent sleeve 68 is positioned to align with aperture 66 when hollow shaft 62 has been rotated to place the valve 12 in the closed position (position shown in FIG. 2). A manifold or duct 72 connects vent sleeve 68 to a lower pressure source external valve 12 thereby creating a vent flow for plenum 59 when disks 38 and 40 are located in the closed position. Any contaminated fluid leakage through the gap between annular lip 56 and disk 38 is drawn through plenum 59 into aperture 64, through hollow shaft 62 to aperture 66, and out of vent sleeve 68 to the manifold 72.

In accordance with the present invention, flow leakage cannot pass through valve 12. The lower pressure source can be achieved by connecting the manifold 72 to the intake of a second exhaust fan (not shown) thereby creating a partial vacuum in the plenum 59. When the upstream duct 60 of valve 12 constitutes the impure feed line 24, the contaminated fluid vented from plenum 59 through manifold 72 can be fed back into feed line 24. Thus, contaminated fluid leakage cannot escape into the atmosphere from incinerator 10.

Alternatively, plenum 59 can be pressurized with a higher pressure flow of innocuous fluid to prevent any fluid leaking from duct 60 to duct 61. The innocuous fluid can be suitably tapped from the cleansed purge air duct 30, and supplied to manifold 72. Thus, pressurized innocuous fluid will pass through the apertures 64 and 66 in hollow shaft 62, and flow out the gaps between butterfly disks 38 and 40 and the respective lip edges 56 and 58 on the valve housing 54 to preclude the passage of emissions into the plenum 59. Because emissions cannot pass into plenum 59, leakage through the valve is prevented. Further, since the aforesaid air flow comprises cleansed air, there is provided an effectual substitution of cleansed pressurized air flowing out of plenum 59 for contaminated air flowing into plenum 59. In order to assure proper air flow for plenum 59, the minimum flow area of apertures 66 and 70 and duct 72 should be at least 20% greater than the clearance area between lip 56 and disk 38 plus the area between lip 58 and disk 40.

A set of mechanical stop elements can further be mounted internally to valve housing 54 so that valve disks 38 and 40 are at a controlled location when valve 12 is closed. Since the stop elements would not constitute any part of the valve sealing, the stops can be implemented as spring loaded stops.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

I claim:

1. A flow control valve comprising:
   a valve housing;
   a pair of parallel valve disks;
   a shaft extending diametrically through said valve housing, wherein at least a portion of said shaft is hollow and extends exterior of said housing;
   a means for mounting said pair of valve disks to said shaft in parallel relation to each other to form a valve plenum between said pair of disks, said shaft causing said pair of disks to rotate between a valve open position and a valve closed position;
   a pair of annular housing flanges on the inner periphery of said valve housing, each flange being radially aligned with a respective one of said pair of valve disks when said valve is in the closed position, and each of said pair of flanges extending radially to an inside diameter greater than the outside diameter of said respective one of said pair of valve disks so as to provide a clearance therebetween;
   a first aperture in the hollow portion of said shaft located internally of said housing;
   a second aperture in the hollow portion of said shaft located externally of said housing;
   and,
   conduit means connected to the hollow portion of said shaft extending exterior of said housing, and to an external pressure source, said conduit means providing a fluid flow path between said valve plenum and said external pressure source when said valve is in the closed position.

2. The flow control valve of claim 1 wherein said external pressure source is at a higher pressure than either said valve inlet or exit conduit.

3. The flow control valve of claim 1 wherein said external pressure source is at a lower pressure than either said valve inlet or exit conduit.

4. The flow control valve of claim 1 wherein said conduit means comprises a sleeve attached externally to said valve housing and encompassing the hollow portion of said shaft extending externally of said valve housing, said sleeve further comprising an inlet for connection to said external pressure source, wherein said second aperture aligns with said inlet when said valve is in the closed position.

* * * * *